United States Patent
Weatherman (10) Patent No.: US 11,840,858 B2
(45) Date of Patent: Dec. 12, 2023

(54) MODULAR SURVIVAL CANVAS FOR OUTDOOR SHELTER

(71) Applicant: Brett Weatherman, Windsor (CA)

(72) Inventor: Brett Weatherman, Windsor (CA)

( * ) Notice: Subject to any disclaimer, the term of this patent is extended or adjusted under 35 U.S.C. 154(b) by 0 days.

(21) Appl. No.: 18/153,055

(22) Filed: Jan. 11, 2023

(65) Prior Publication Data
US 2023/0340799 A1 Oct. 26, 2023

Related U.S. Application Data (63) Continuation of application No. 17/725,141, filed on Apr. 20, 2022, now Pat. No. 11,578,500.

(51) Int. Cl.
*E04H 15/30* (2006.01)
(52) U.S. Cl.
CPC .................. *E04H 15/30* (2013.01)
(58) Field of Classification Search
CPC .......... E04H 15/00; E04H 15/24; E04H 15/30
See application file for complete search history.

(56) References Cited

U.S. PATENT DOCUMENTS

| 197,878 A | 12/1877 | Michaelis | |
|---|---|---|---|
| 779,500 A | * 1/1905 | Rice | E04H 15/24 126/30 |
| 901,802 A | * 10/1908 | Gotsche | E04H 15/24 135/97 |
| 1,204,427 A | 11/1916 | Grace | |
| 1,636,507 A | 7/1927 | Goodman | |
| 2,755,009 A | 7/1956 | Parker | |
| 2,796,877 A | 6/1957 | Berseth | |
| 2,907,056 A | 10/1959 | Kaplan | |
| 4,265,261 A | 5/1981 | Barker | |
| 4,838,293 A | 6/1989 | Novak | |
| 5,033,497 A | 7/1991 | Hernandez | |
| 5,217,034 A | 6/1993 | Yih et al. | |
| 5,669,182 A | 9/1997 | Griffis | |
| 5,924,132 A | 7/1999 | Witgutow | |
| 6,167,898 B1 | 1/2001 | Larga et al. | |
| 6,397,869 B1 | 6/2002 | Jennings | |
| 7,406,977 B1 | 8/2008 | Shires | |
| 8,001,986 B2 | 8/2011 | Shumate | |
| 9,428,931 B2 | 8/2016 | Samaripa | |
| 9,578,952 B1 | 2/2017 | Wray | |
| 2006/0137731 A1 | 6/2006 | Anue | |
| 2006/0215940 A1 | 9/2006 | May | |
| 2014/0299638 A1 | 10/2014 | Hutchins | |
| 2017/0234029 A1 | 8/2017 | Walter | |
| 2018/0064234 A1 | 3/2018 | Graff | |

FOREIGN PATENT DOCUMENTS

| CN | 204409939 U | 6/2015 |
|---|---|---|
| DE | 202014009479 U1 | 6/2015 |

* cited by examiner

*Primary Examiner* — Noah Chandler Hawk
(74) *Attorney, Agent, or Firm* — Brooks Kushman P.C.

(57) ABSTRACT

A modular recreational and/or survival canvases are disclosed. Each canvas may be used alone or in combination with other canvases to provide shelter. Each canvas includes a base substrate including a plurality of fastener, a plurality of sleeves, and an outer fringe. In a refinement, the canvas may be of a shape such as a hexagon with alternating fasteners along its perimeter such that it may cooperate with one or more other modular canvases to form larger shelters. In one or more embodiments, the canvases may be combined with a construction block and one or more stakes.

15 Claims, 14 Drawing Sheets

MODULAR SURVIVAL CANVAS FOR OUTDOOR SHELTER

CROSS-REFERENCE TO RELATED APPLICATIONS

This application is a continuation of U.S. application with Ser. No. 17/725,141 filed Apr. 20, 2022 and issued on Feb. 14, 2023 as U.S. Pat. No. 11,578,500, the disclosure of which is hereby incorporated by reference in its entirety.

TECHNICAL FIELD

In at least one aspect, the present invention relates to a modular canvas for enacting a shelter or protection while sleeping in the outdoors.

BACKGROUND

Adventurers, hunters, and survivalists seek thrilling recreational activities in rugged, dangerous and remote areas that lack common amenities and basic housing. Similarly, military personnel may be required to survive in remote and dangerous areas with limited resources. Tents and tarps may be employed as a temporary shelter while in these remote location. But tents may by add unnecessary weight, take up limited cargo volume, and lack flexibility. For example, tents are not modular, scalable and may be unnecessarily complex. On the other end of the spectrum is tarps which are rudimentary and often a last resort. However, a tarp is not designed to provide a dry and warm environment in the bush. Tarps are also not easily assembled together with other tarps (i.e., modular or scalable) to create structures of the desired shape or size. Still further, the use of a tarp as a shelter may require the foresight to bring additional tools or to ensure resource to build a structure are in the remote location. Accordingly, a need for more flexible and effective survival/outdoor shelters or shelter systems exists.

SUMMARY

A modular recreational or survival canvas is disclosed. The canvas includes a base substrate, first and second fasteners, a plurality of sleeves and an outer fringe. The base substrate has a first side and a second side opposite the first side. The first and/or second side may have a water-resistant surface. The base substrate may be of a predetermined shape having an outer perimeter such as a hexagon. The first and second fasteners may be disposed along the outer perimeter such that a first end of the outer perimeter may be coupled to a second end of the outer perimeter. The plurality of sleeves may be disposed on the first and/or second side. The outer fringe may be coupled to and disposed along the outer perimeter. The outer fringe may define a plurality of orifices.

A modular survival shelter system is disclosed. The shelter system may include one or more water-resistant canvases, a construction block and one or more stakes. Each canvas may include a base substrate having a first side and a second side opposite the first side. The base substrate may have a polygonal shape defining an outer edge portion. Each canvas may also include an outer skirt coupled to and disposed along the outer edge portion. The outer skirt may include a plurality of fasteners. Each canvas may also include a second plurality of fasteners. The second plurality of fasteners may be disposed on the second side along the outer edge portion such that a first section of the outer edge portion may be coupled to a second section of the outer edge portion. Each canvas may also include a plurality of sleeves disposed on the second side. The construction block may include a first plurality of apertures. Each stake may include a second plurality of apertures such that the block and one or more stakes may be configured to provide a support structure or frame for the one or more water-resistant canvas when used in combination with one or more rod structures or cordage.

A modular shelter system is disclosed. The system includes a plurality of canvases. Each canvas includes a substrate having an outer surface and an inner surface opposite the outer surface. Each canvas includes a first fastener along the outer periphery of the inner surface such that it is configured to be coupled to one or more other canvases. The inner and outer surfaces are water resistant. Each canvas also includes a fringe along the outer periphery. The fringe includes a plurality of second fasteners such that each canvas is configured to be coupled to at least two other canvases.

DETAILED DESCRIPTION

Reference will now be made in detail to presently preferred embodiments and methods of the present invention, which constitute the best modes of practicing the invention presently known to the inventor. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts are to be understood as modified by the word "about" in describing the broadest scope of the invention. Practice within the numerical limits stated is generally preferred. Also, unless expressly stated to the contrary: percent, "parts of," and ratio values are by weight. The description of a group or class as suitable or preferred for a given purpose in connection with the invention implies that mixtures of any two or more of the members of the group or class are equally suitable or preferred. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

The phrase "composed of" means "including" or "comprising." Typically, this phrase is used to denote that an object is formed from a material.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Throughout this application, where publications are referenced, the disclosures of these publications in their entireties are hereby incorporated by reference into this application to more fully describe the state of the art to which this invention pertains.

Figure 1A:
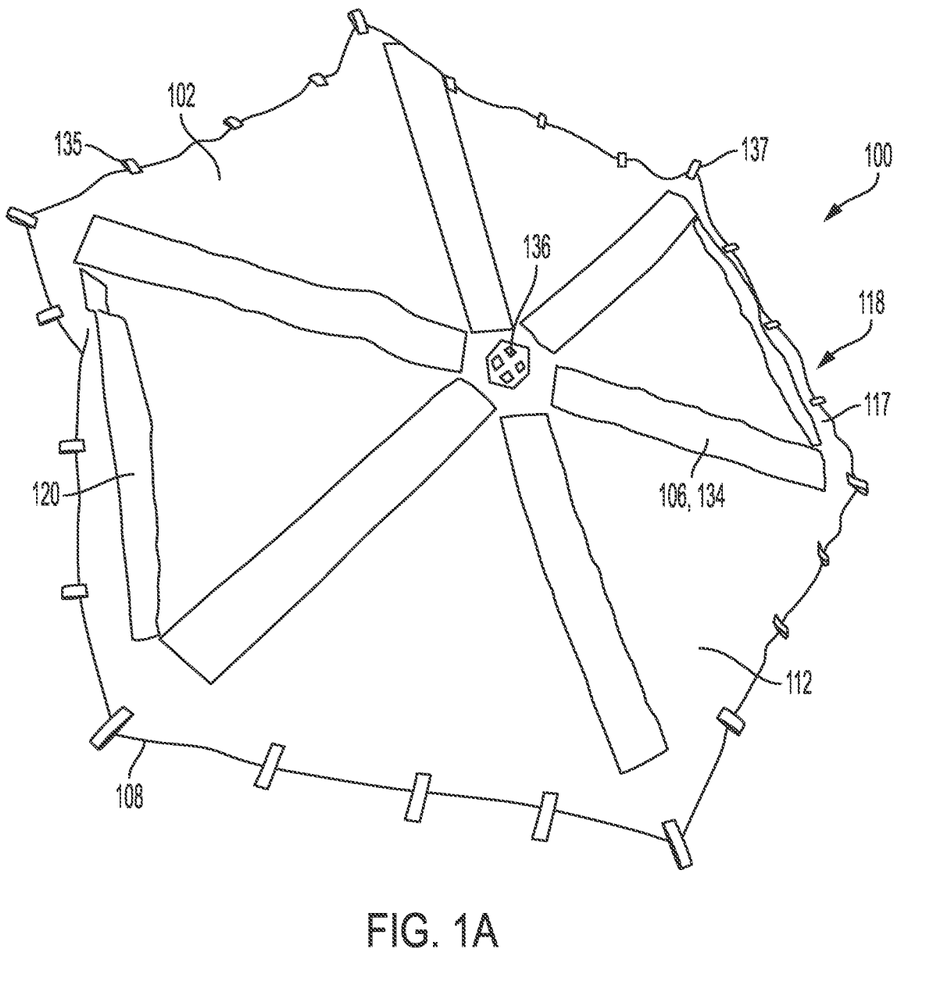
FIG. 1A is a first side of a modular survival canvas and FIG. 1B is a second side of the modular survival canvas.
Figure 1B:
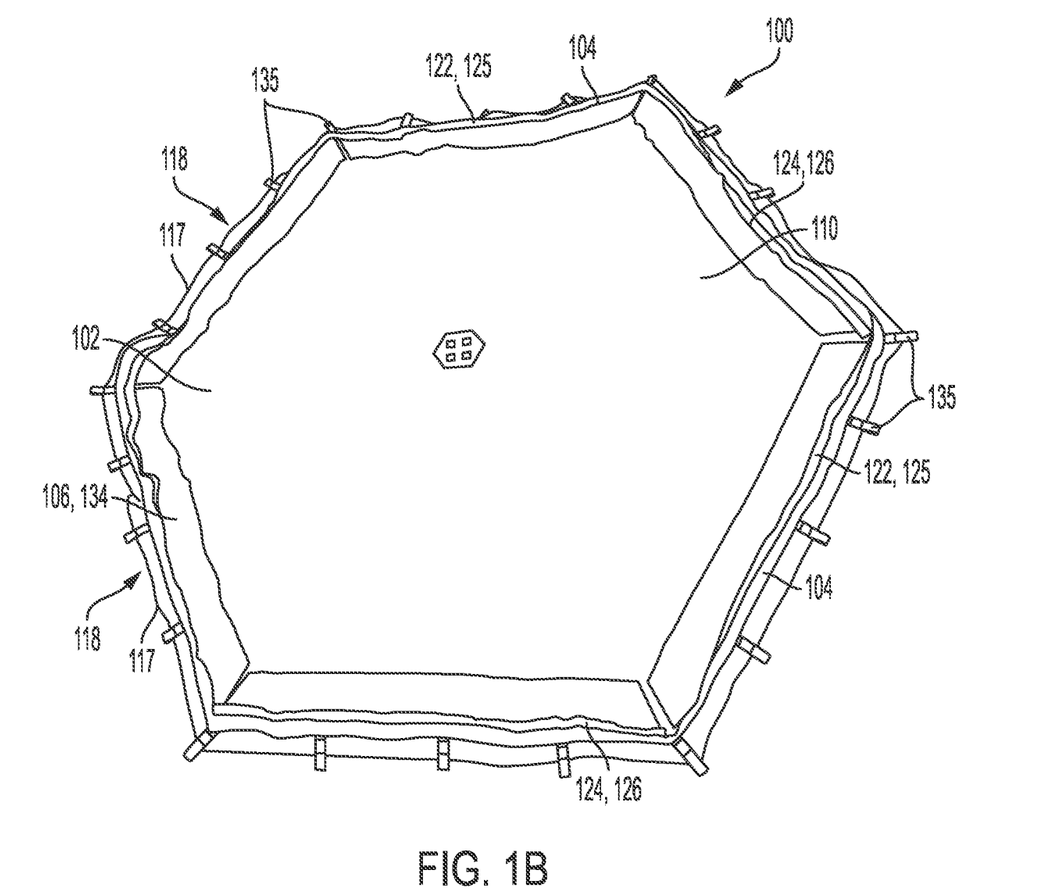
Figure 2A:
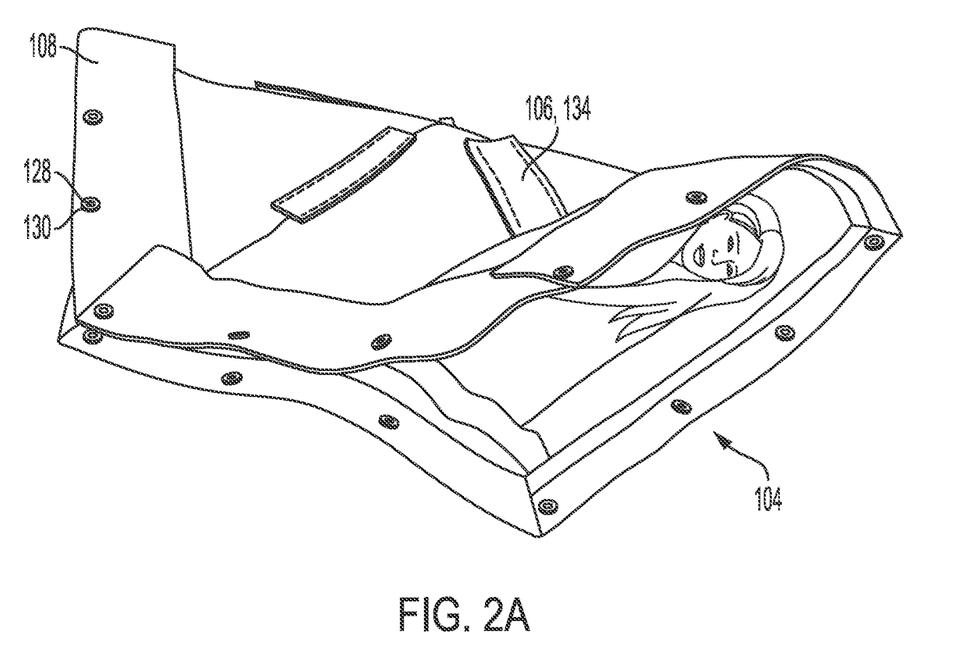
FIGS. 2A-C are various uses of the modular survival canvas of FIGS. 1A-B.
Figure 2B:
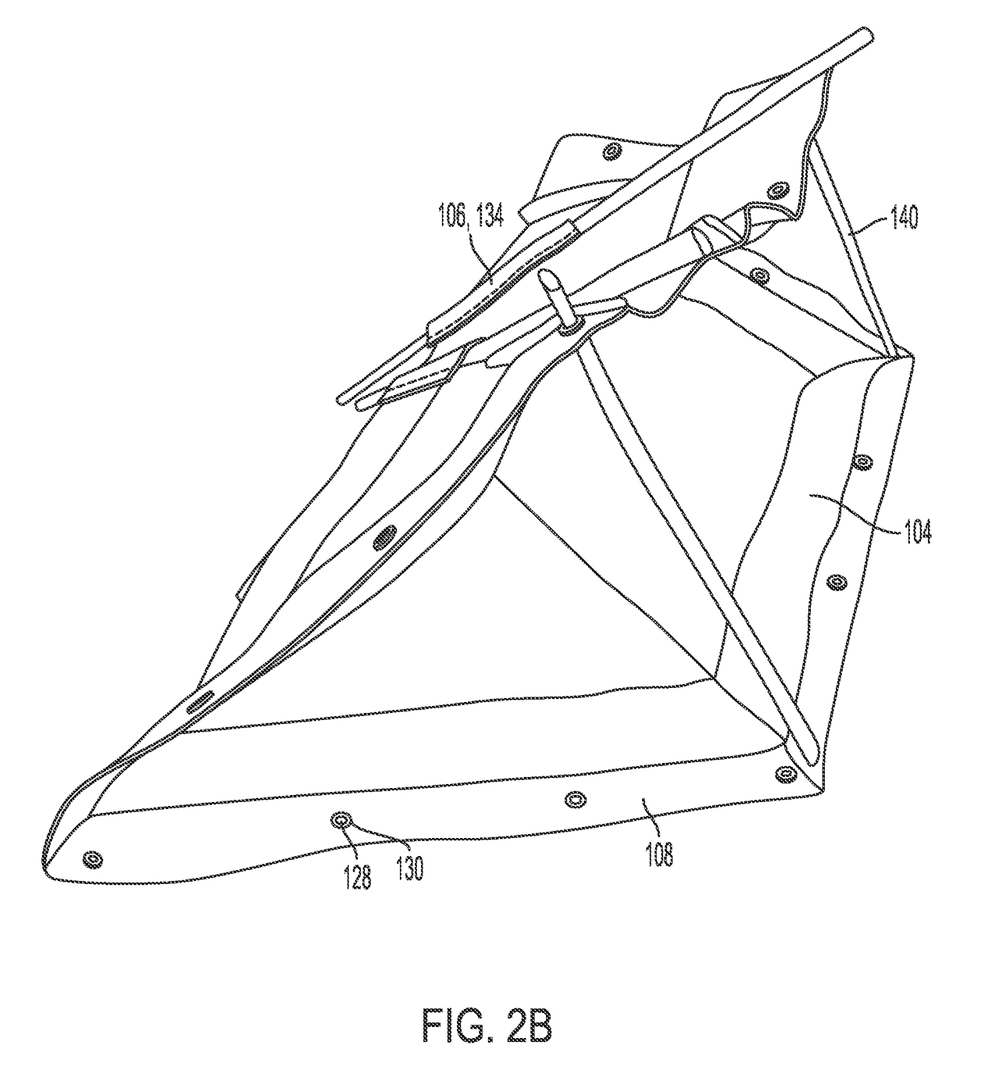
Figure 2C:
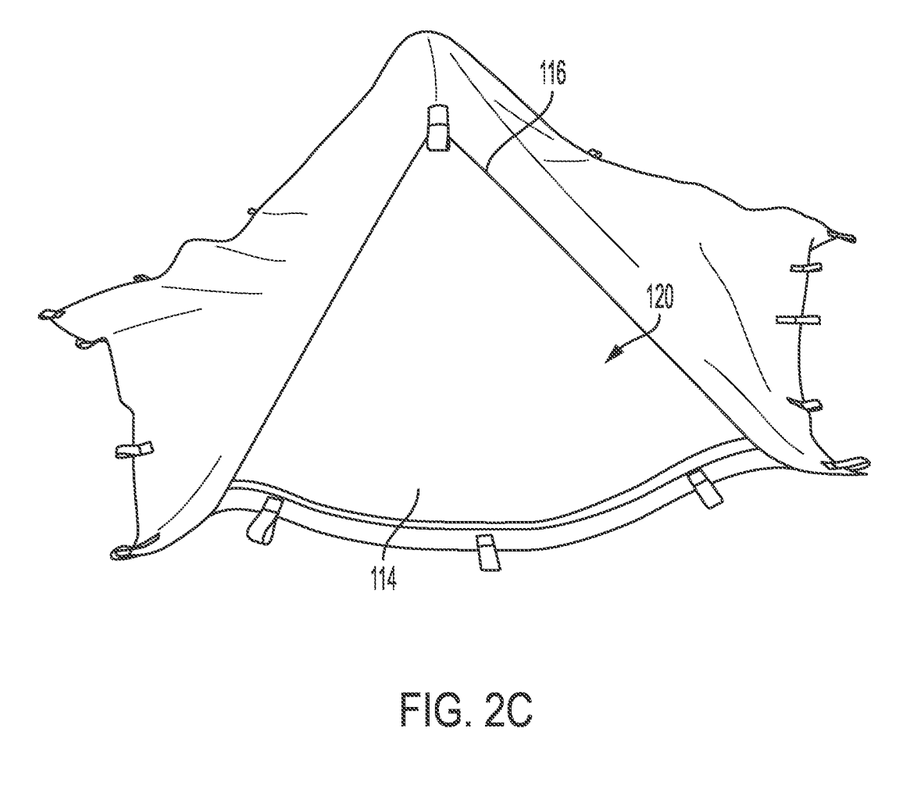
Figure 2D:
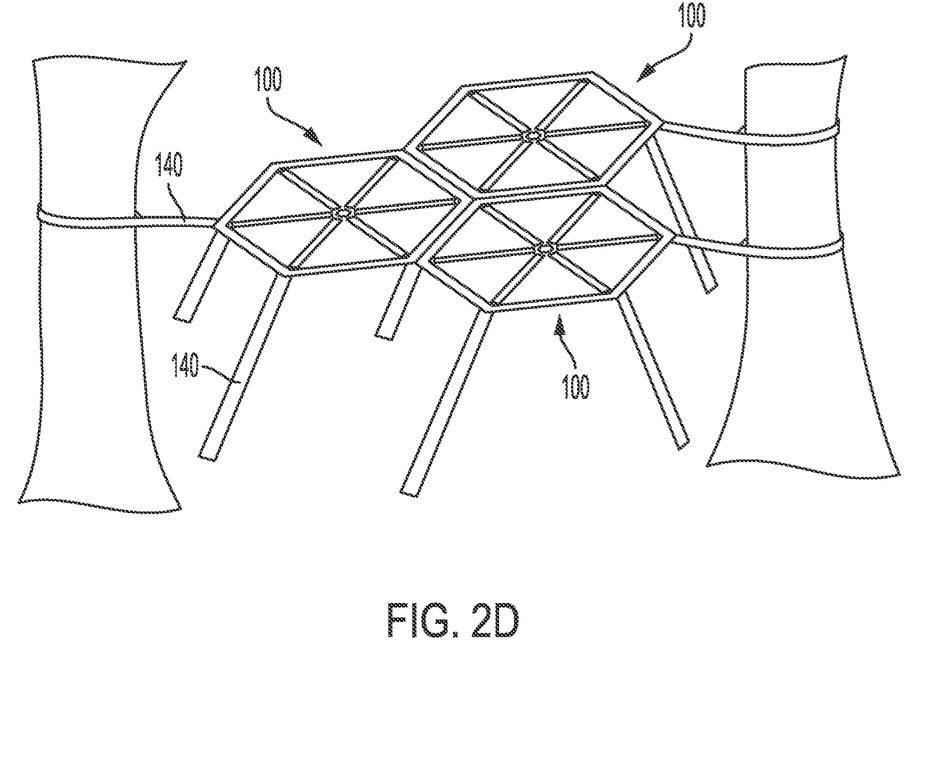
FIG. 2D is a large shelter constructed from a plurality of modular survival canvases coupled together.

Referring to FIGS. 1A-B, a modular recreational/survival canvas 100 is disclosed. The canvas 100 may include a base substrate 102, a plurality of fasteners 104, a plurality of construction sleeves 106, and an outer fringe 108. The canvas 100/base substrate 102 may have a first surface 110 (shown in FIG. 1B) and a second surface 112 (shown in FIG. 1A) opposite the first surface 110. The recreational/survival canvas 100 may be used as bivouac as shown in FIG. 2A, a small shelter as shown in FIG. 2B, another small shelter between multiple layers of the base substrate 102 as shown in FIG. 2C, or a medium/large shelter by combining with additional recreational/survival canvases. The canvas 100 may also be used as a hammock or a cargo net.

The base substrate 102 includes first and second surfaces 110, 112 or in other words inner and outer surfaces. The surfaces may be water-resistant. The base substrate 102 may include one or more deformable layer such as fabric layers. For example, the layers may be a ripstop (i.e., woven) nylon, a polyester, and/or a polyurethane. The layers may be at least 100 denier, or more preferably at least 150 denier, or even more preferably at least 200 denier. In a variation, a single layer maybe used such that the overall weight of the canvas 100 is reduced. In another variation, a plurality of layers such as two layers (i.e., first layer 114 and second layer 116) may be used as the base substrate 102. The plurality of layers may be joined at, along or proximate to the edge 117 and/or the outer perimeter/periphery portion 118 of the layers. In a refinement, the base substrate 102 may include an entryway 120 therebetween. The entryway 120 may be configured to provide access between the first and second layers 114, 116. The entryway 120 may be opened and closed. For example, the entryway 120 may be closed via Velcro® or a zipper. Thus, a user 10 may seek shelter such as warmth and/or dryness between the first and second layers 114, 116.

The base substrate 102 may be any suitable shape and size. In a variation, the predetermined shape may be polygonal and is the primary shape and size of the canvas 100. A polygonal shape may more easily be combined with other canvases. For example, a triangular canvas may more easily be coupled to three other canvases along each side and a hexagonal canvas (as in the figures) may be more easily coupled to six other canvases. The canvas may have a max ferret diameter of 2 to 14 feet, or more preferably 4 to 12 feet, or even more preferably 6-10 feet. For example, in the hexagonal shape, the base substrate may be 8 feet from one corner to the opposite corner.

The canvases may be coupled via a fastener or a plurality of fasteners such as a hook, loop, hook and loop tape (hereinafter referred to solely as Velcro®), orifice, grommet, cordage, zipper, any other suitable fastener, or a combination thereof. For example, the canvas 100 may include at least first and second fasteners 122 and 124. In yet another variation, the canvas 100 may include a third fastener. One or more fasteners may be located on the base substrate 102, peripheral portion 118 of the base substrate 102, or the fringe 108. In a variation, one or more fasteners may be located on the first surface 110, second surface 112 or a combination thereof.

In a refinement, the fastener may be Velcro®. If the fastener includes two components such as a male and female component, a hook and loop, or Velcro®. The fastener may alternate between the two components along the perimeter portion 118. For example, each side of the hexagonal shape may alternate between the hook segment 125 of Velcro® and the loop segment 126 of Velcro®. In a refinement, half of the perimeter may be the hook segment and half may be the loop segment. The Velcro® tape may be 0.1 to 5 inches wide, or more preferably 0.5 to 3 inches wide, or even more preferably 0.5 to 1.5 inches wide. For example, Velcro® tape may be 1-inch wide. In a refinement, the fastener may include 1-10 strips of Velcro® (e.g., one strip, two strips, three strips, four strips, five strips, or more). For example, two 1-inch strips of Velcro® may be used.

The fastener may also be orifices 128. The orifices 128 may include grommets 130. In a refinement, a plurality of orifices 128 and/or grommets 130 may be used and may be disposed along the fringe 108. For example, three orifices with grommets therein may be disposed along each side of the canvas 100 and an orifice with a grommet therein may be disposed at each corner.

The fasteners may be loops such as fabric loops 135. In a variation, the canvas 100 may include a plurality of fabric loops 135. The loops 135 may be located on the near the outer edge of the fringe 108 or proximate thereto. For example, the canvas 100 may include a fabric loop 135 or a plurality of fabric loops 135 (e.g., three) on each side. Fabric loops 135 may also be disposed at each corner. In yet another example, a loop such as a crosshatch loop 136 may be located at the center of the base substrate 102 on the first surface 110, second surface 112, or both.

Each corner may also include a pull tab 137 for easier assembly and disassembly. Pull tabs 137 may facilitate opening, closing, assembling, and/or disassembling the canvas 100 during low light conditions and suboptimal conditions. The pull tab 137 may also include a pocket configured to hold the end of a stick, bar, cane, rod, or pole. The sticks, bars, canes, rods, or poles may be natural and found in the environment or manufactured for that particular purpose. For example, the poles may be configured to provide a geometric shape when assembled together. Portions of the poles may include bends or the poles may be straight.

Figure 1C:
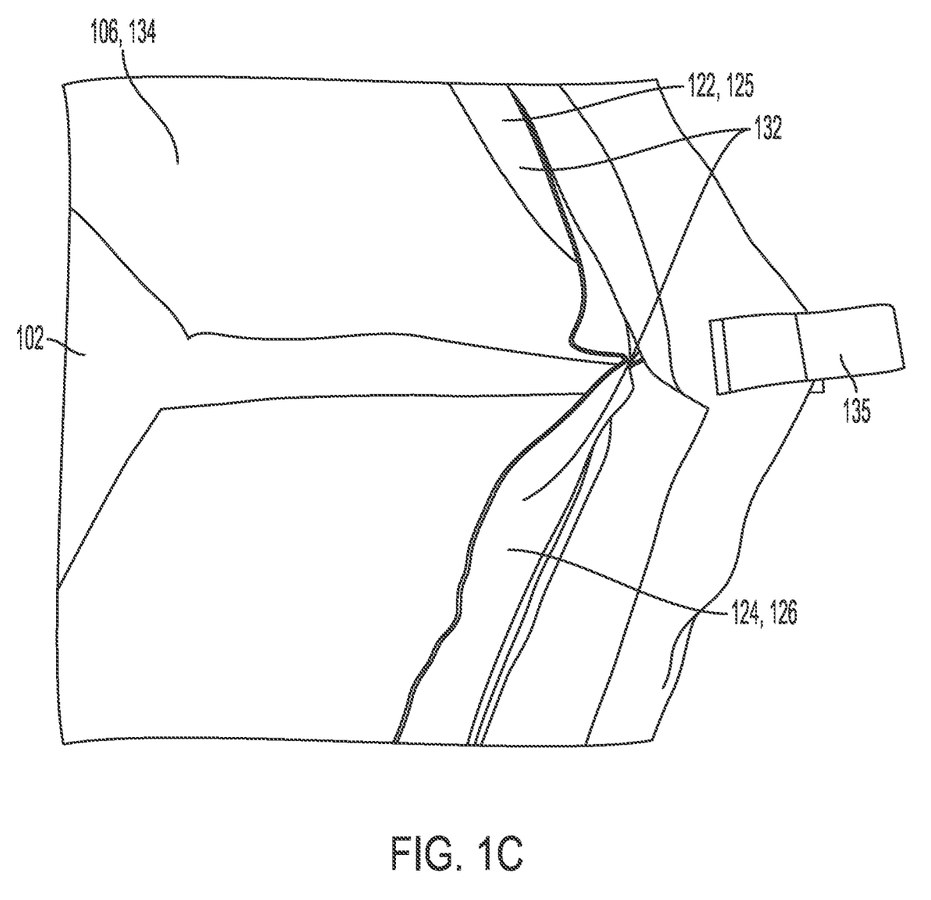
FIG. 1C is a portion of the canvas having a flap.

In yet another embodiment, the base substrate 102 may include a flap 132 such that a fastener or a portion thereof may be disposed on the flap 132, as shown in FIG. 1C. The flap add versatility to the canvas 100 when coupled to another canvas or another section of the canvas 100. The flap may also act to facilitate an overlap that reduces drafts and/or breezes and leaks that may let in water. The flap may extend from the first and/or second surface 110, 112.

The fringe 108 may be a fringe, skirt, hem, brim or a combination thereof. The fringe 108 may be disposed along the outer edge of the base substrate 102. In other words, the fringe 108 may be joined and/or connected to the base substrate 102 such that it protects the edge 118 of the base substrate 102. In a refinement, the fringe 108 may be made of material that is more durable and/or stronger material than the base substrate 102. For example, the fringe may have a tensile strength of at least 500 lbs/in, more preferably 1000 lbs/in, or even more preferably 3000 lbs/in. For example, the fringe 108 may be made of a seatbelt material. A seatbelt material is a webbing that is woven. The seatbelt material may also have run-proof selvedges. One or more fasteners such as a plurality of fasteners should be disposed in and/or on the fringe 108. In one or more embodiments, the fringe may be 0.1 to 10 inches, or more preferably 1 to 5 inches, or even more preferably, 2 to 3 inches wide. For example, the fringe may be 2.5 inches wide.

The canvas 100 may also include one or more sleeves 134. The one or more sleeves 134 may be used to provide structural support for building and/or constructing structures such as shelters. For example, a stick, bar, cane, rod, pole, or cordage 140 may be placed through a sleeve to support a structure. For example, the canvas 100 may include a plurality of sleeves. The sleeves may be located on the first surface, the second surface or a combination thereof. The plurality of sleeves may be disposed in a pattern such as the spokes on a wheel. In a refinement, the sleeves may be closer to the center of the base substrate 102 than the fringe 108 and fasteners. Alternatively, or in combination the sleeves may be disposed along the edges of the base substrate 102 such as at the perimeter portion 108. The sleeves 134 may also be made of a seatbelt material. The sleeves may for example be about 0.1 to 8 inches, more preferably, 0.5 to 5 inches, or even more preferably 1 to 3 inches wide. The sleeves may also be 0.1 to 96 inches, or more preferably 12 to 84 inches, or even more preferably 36 to 62 inches long. For example, the sleeves may be 2×48 inches.

The canvas 100 may colored or have a design based on its intended purpose. For example, a survival canvas 100 may be hunter's orange such that it is easily spotted from a distance such as by search and rescue. Alternatively, the survival canvas may have a camouflage coloring and design such that it can be used for hunting or the military. The canvas may also have indicia on it to facilitate its purpose. For example, the indicia may provide survival instructions such as seek shelter, find water, start a fire and/or how to build a shelter, find water, and/or how to start a fire.

Figure 3A:
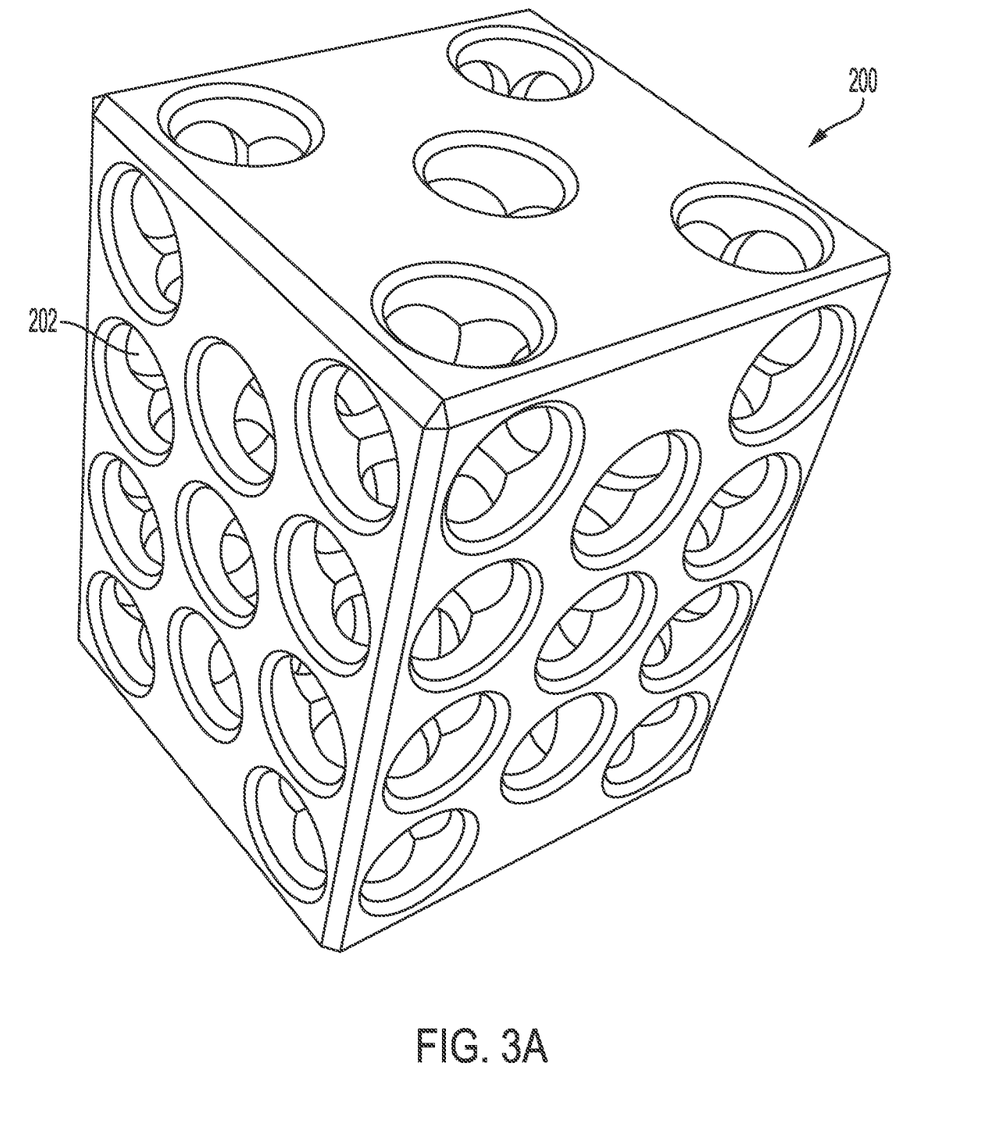
FIG. 3A is a perspective view of a construction block and FIG. 3B is a perspective view of a construction block being used with the modular survival canvas of FIGS. 1A-B.
Figure 3B:
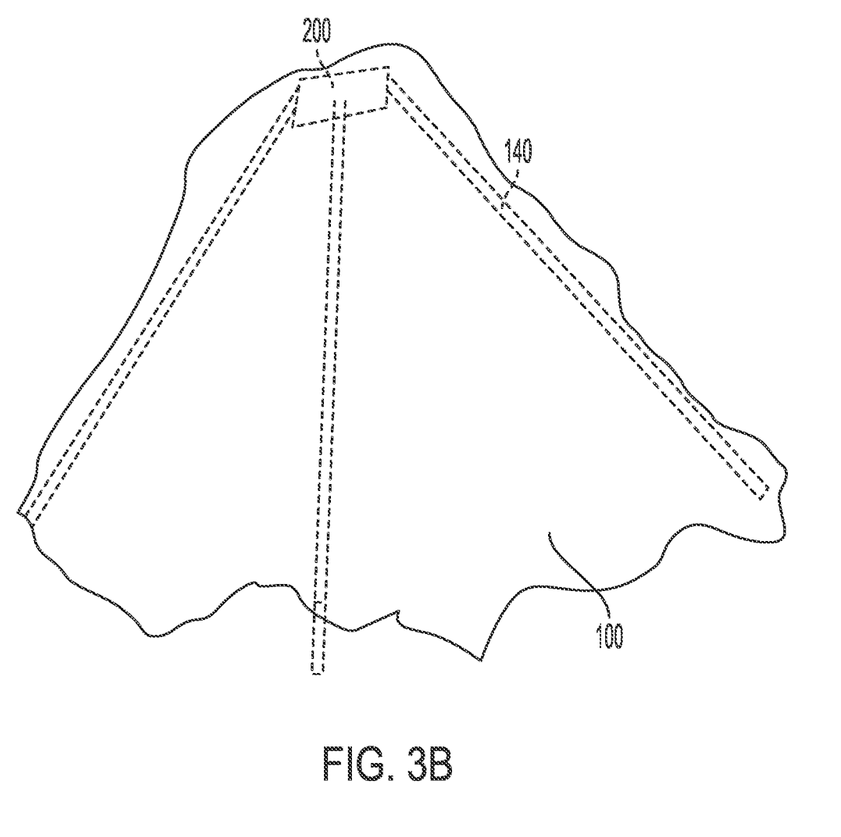
Figure 3C:
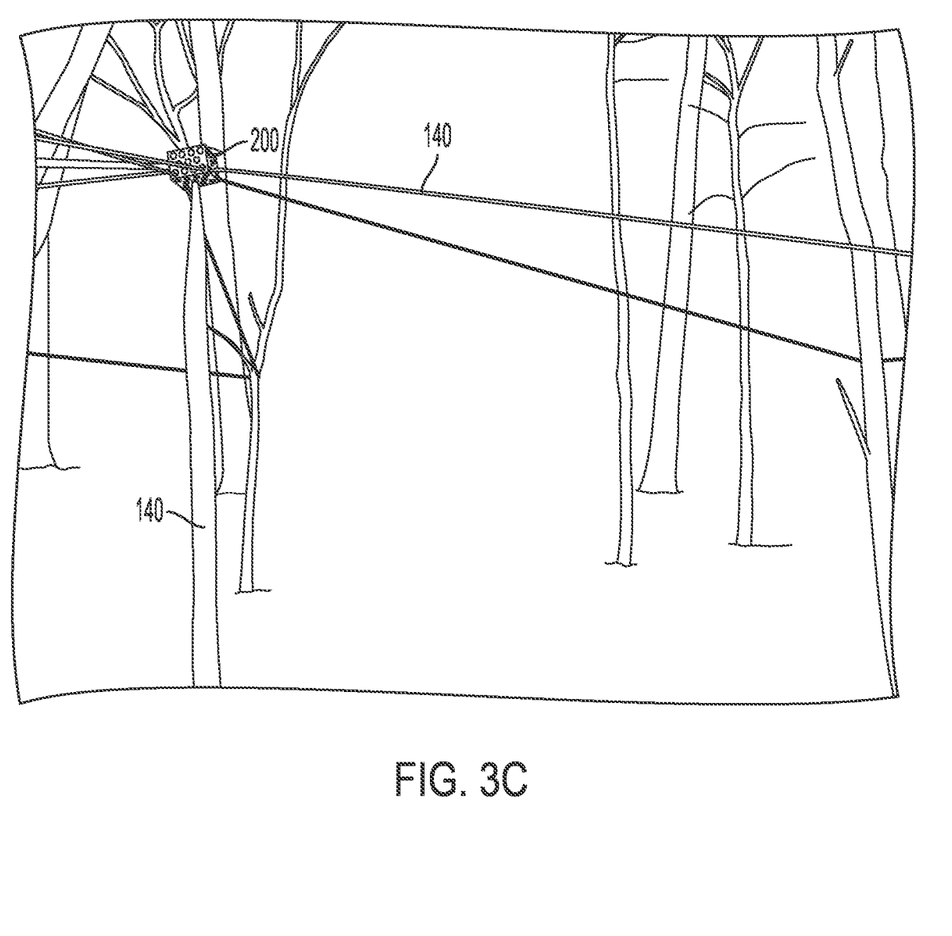
FIGS. 3C-D are perspective views of the construction block being used with stick, cordage and vegetation to provide a frame for the canvas.
Figure 3D:
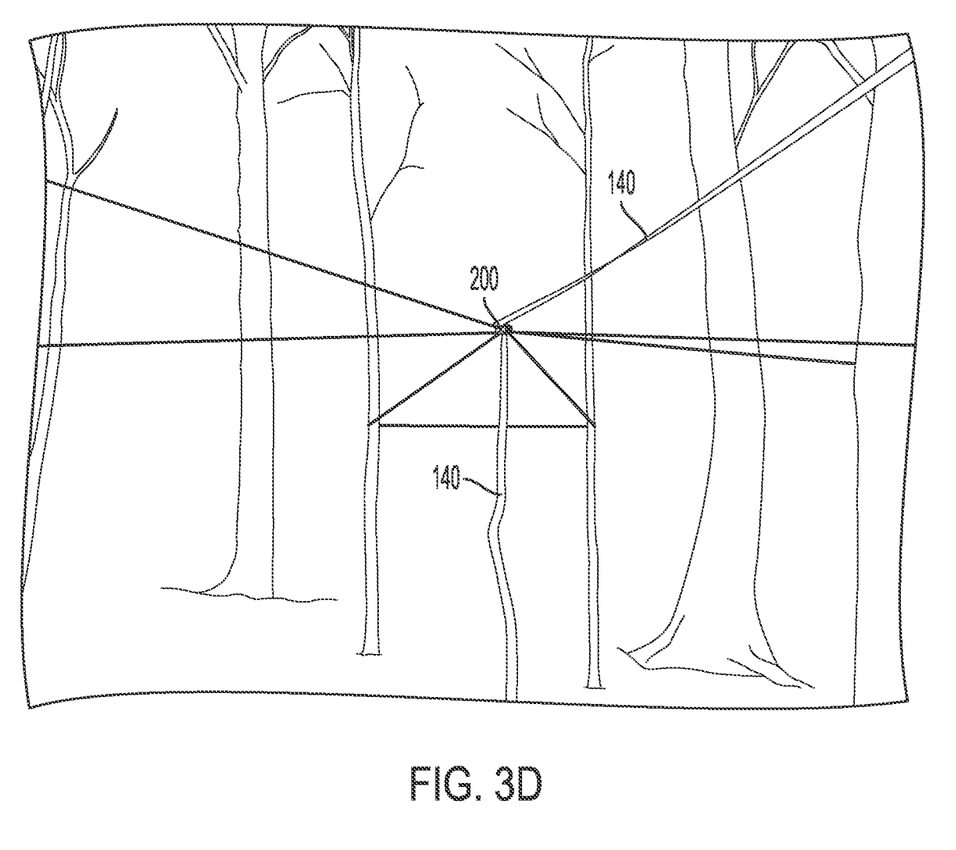

A construction block 200 is disclosed, as shown in FIG. 3A. The construction block 200 may be used in conjunction or with the canvas 100 to erect a structure such as a shelter as shown in FIG. 3B. The construction block 200 may be used to assembly a frame such as with materials in environment, cordage, or a combination thereof as shown in FIGS. 3C-D. The canvas 100 may than be drawn around the frame to provide a shelter. The construction block 200 may be but is not limited to a rectangular shape. The construction block 200 may include a plurality of apertures 202 or porous structure such that sticks, bars, canes, rods, poles, or cordage may be inserted through it to erect a frame. The apertures 202 may be the same size or different sizes. For example, the apertures 202 may be 0.1 to 1 inch, or more preferably 0.25 to 0.75 inches, or even more preferably 0.4 to 0.6 inches wide. In a refinement, the construction block 200 may have apertures on every surface or side. For example, a rectangular construction block 200 may have apertures on all six sides. The apertures on may be channels that provide passage through the construction block 200 such that sticks, bars, canes, rods, poles, or cordage may be passed through the construction block 200. The construction block 200 may be made of stratified layer such as from additive manufacturing (e.g., 3D printing). The construction block 200 may be made of plastic, metal, or wood. For example, the construction block 200 may be made of but is not limited to galvanized steel, stainless steel, polyvinyl alcohol, acrylonitrile butadiene styrene, polylactic acid, polyethylene terephthalate, polyethylene (high or low density), polyvinyl chloride, polypropylene, or a combination thereof.

Figure 4A:
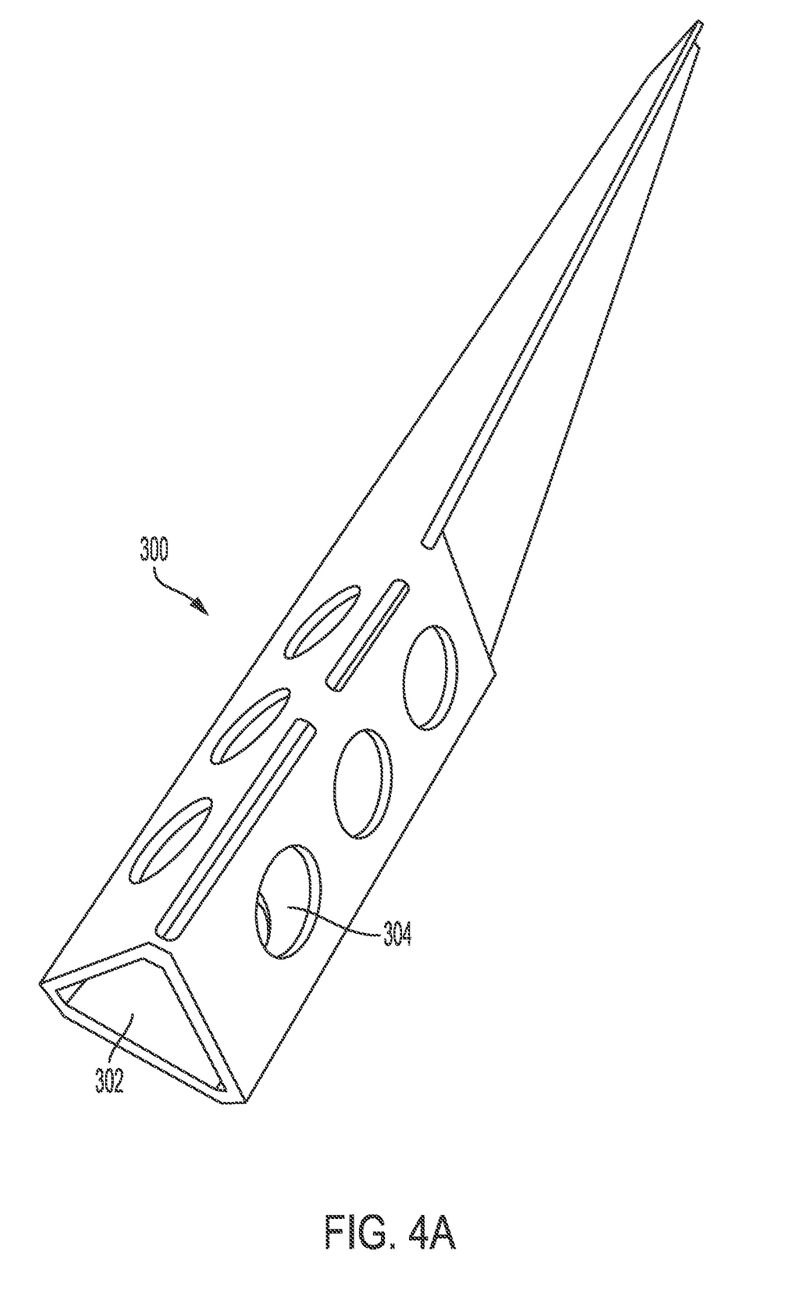
FIG. 4A is a perspective view of a stake and FIG. 4B is the stack being used with a stick.
Figure 4B:
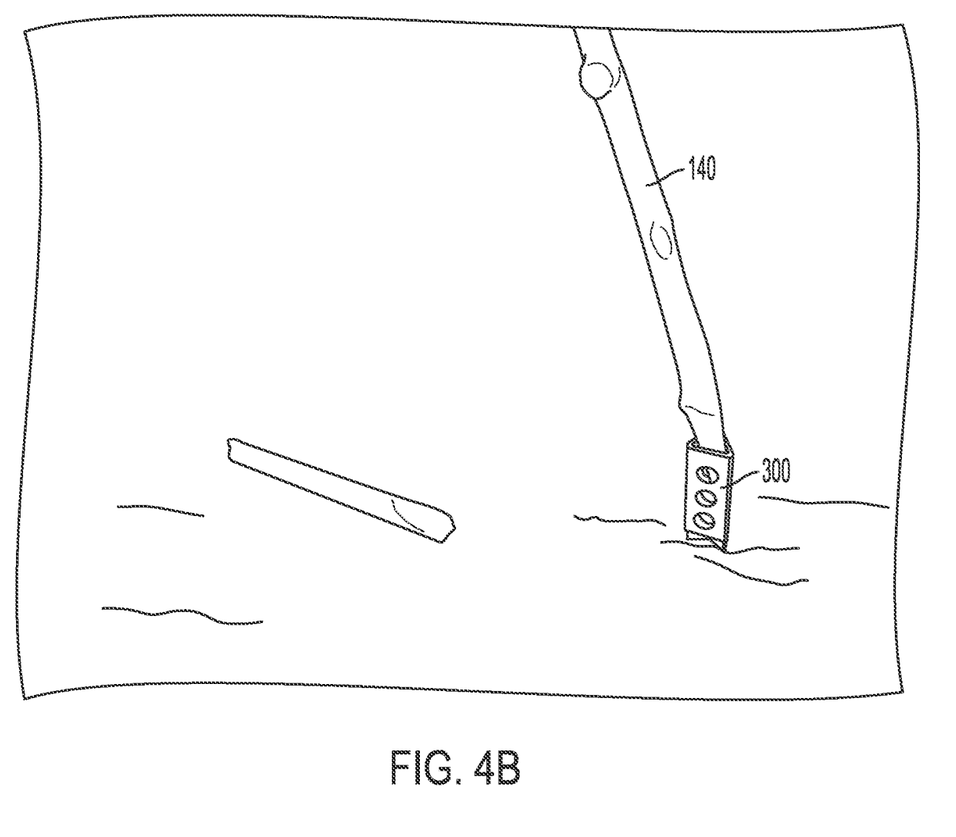

A stake 300 is disclosed, as shown in FIG. 4A. The stake 300 may be 1 to 20 inches, more preferably 5 to 15, or even more preferably 8 to 10 inches long. The stake 300 may be hollow or have a hollow channel 302 to reduce its weight and facilitate construction. The hollow channel may have a width of 0.1 to 3 inches, or more preferably 0.25 to 2 inches, or even more preferably 0.5 to 1.5 inches. In a refinement, the hollow channel 302 may have a triangular profile such that each side is 0.1 to 3 inches wide, or more preferably 0.25 to 2 inches, or even more preferably 0.5 to 1.5 inches. For example, a stick, bar, cane, rod, pole, or cordage may be disposed in the hollow channel 302 of stake 300 as shown in FIG. 4B. The stake 300 may be made such that it may be bent into shape forming multiple walls 304 defining the hollow channel 302. The walls may have a width of 0.015625 to 0.5 inch, or more preferably 0.03125 to 0.25 inch or even more preferably 0.05 to 0.2 inch. The stake 300 may also include one or more apertures 304. The apertures 304 may be 0.1 to 1 inch, or more preferably 0.25 to 0.75 inches, or even more preferably 0.4 to 0.6 inches wide. The apertures 304 may be the same of different sizes. The apertures 304 may also be the same or different size than the apertures 202. If the apertures 304 are of the same or similar sizes to apertures 202 they may facilitate construction of structures. The stake 300 may be made of stratified layers such as from additive manufacturing or 3D printing. The stake 300 may be made of plastic, metal, or wood. For example, the stake 300 may be made of but is not limited to galvanized steel, stainless steel, polyvinyl alcohol, acrylonitrile butadiene styrene, polylactic acid, polyethylene terephthalate, polyethylene (high or low density), polyvinyl chloride, polypropylene, or a combination thereof. In a variation, the stake may be made by bending the material into the appropriate shape.

Figure 5:
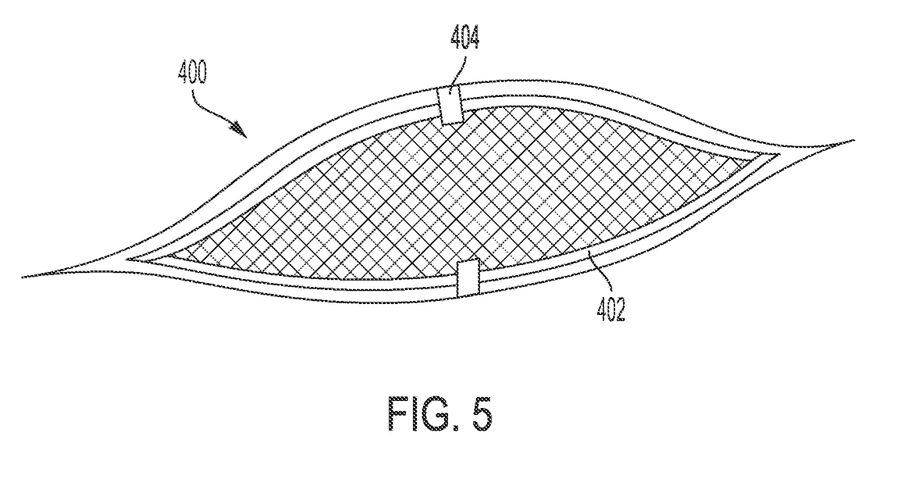
FIG. 5 is a perspective view of a net.

A net 400 (e.g., bug net) may be disclosed, as shown in FIG. 5. The net 400 may include one or more fasteners 402 such as Velcro® segments configured to couple the net 400 to the canvas 100. In a refinement, the net 400 may be eye-shaped such that it fits within the canvas 100 when used as bivouac as in FIG. 2A or constructed like a taco as shown in FIG. 2B. The net may be 12 to 72 inches, or more preferably 24 to 60 inches, or even more preferably 36 to 48 inches from point to point. The width between the vertices of the curved sides may be from 6 to 48 inches, or more preferably 12 to 36 inches, or more even preferably 15 to 27 inches. The net may further include pull tabs 404 such that they can be located by feel and easily pulled in the dark to decouple the net 400 from the canvas 100.

A recreational or survival shelter system is disclosed. The system may include one or more canvases, one or more construction blocks, one or more stakes, one or more nets or a combination thereof. In a variation, the system may include a plurality of canvases. In yet another variation, a construction block may be included. In still another variation, three or more stakes may be included. In yet another variation, the system may include a net or plurality of nets.

A plurality of blocks, stakes, and canvases may provide endless versatility such as providing numerous shelters. For example, many small shelters or a large shelter with multiple compartments may be created. Further, the canvases, blocks, and stakes provide excellent scalability as, for example, camps grow, separate, and evolve.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of assembling a shelter, the method comprising:
    supporting a first modular canvas; and
    coupling one or more additional modular canvases to the first modular canvas;
    wherein each modular canvas comprises a base material of a predetermined shape and has an outer perimeter and a water resistant-surface, first and second fasteners disposed along the outer perimeter and configured to be coupled together and configured to be coupled the one or more additional modular canvases by corresponding fasteners, a plurality of sleeves to receive a rod disposed on the base material, and an outer fringe coupled to and disposed along the outer perimeter, the one or more additional modular canvases including a number of canvases corresponding to a number of sides of the predetermined shape.

2. The method of claim 1, wherein each modular canvas is configured to be coupled to six other canvases.

3. The method of claim 2, wherein each canvas has a plurality of sleeves arranged along the outer perimeter.

4. The method of claim 3, wherein the second fasteners are further from a center of the base material than the plurality of sleeves.

5. The method of claim 1, wherein the predetermined shape is a hexagon.

6. The method of claim 1, A method of assembling a shelter, the method comprising:
    supporting a first modular canvas; and
    coupling one or more additional modular canvases to the first modular canvas;
    wherein each modular canvas comprises a base material of a predetermined shape and has an outer perimeter and a water resistant-surface, first and second fasteners disposed along the outer perimeter and configured to be coupled together and configured to be coupled the one or more additional modular canvases by corresponding fasteners, a plurality of sleeves to receive a rod disposed on the base material, and an outer fringe coupled to and disposed along the outer perimeter, one or more additional modular canvases including a plurality of modular canvases.

7. The method of claim 6, wherein the plurality of sleeves is arranged in a pattern like spokes on a wheel and/or along the outer perimeter.

8. The method of claim 6, wherein the base material includes first and second layers and a sealable entryway therebetween.

9. The method of claim 8, wherein the first layer includes the water-resistant surface and a second layer is at least 200 denier.

10. The method of claim 6, wherein the base material is woven.

11. The method of claim 6, wherein the predetermined shape is a hexagon.

12. The method of claim 6, wherein the first and second fasteners alternate along the outer perimeter.

13. The method of claim 6, wherein the outer fringe defines a plurality of orifices, and a plurality of grommets is disposed within the plurality of orifices.

14. The method of claim 6, wherein the first and second fasteners are hook and loop fasteners.

15. The method of claim 6, wherein each additional modular canvases of the plurality of modular canvases is coupled along an entire side of the first modular canvas.

* * * * *

UNITED STATES PATENT AND TRADEMARK OFFICE
CERTIFICATE OF CORRECTION

PATENT NO.         : 11,840,858 B2
APPLICATION NO.    : 18/153055
DATED              : December 12, 2023
INVENTOR(S)        : Brett Weatherman Page 1 of 1

It is certified that error appears in the above-identified patent and that said Letters Patent is hereby corrected as shown below:

In the Claims

Column 8, Line 11, Claim 3:
After "The method of claim"
Delete "2" and
Insert -- 1 --.

Column 8, Line 13, Claim 4:
After "The method of claim"
Delete "3" and
Insert -- 1 --.

Column 8, Line 18, Claim 6:
Delete "The method of claim 1".

Signed and Sealed this
Twenty-fourth Day of September, 2024

Katherine Kelly Vidal
*Director of the United States Patent and Trademark Office*